United States Patent [19]
Koguchi et al.

[11] Patent Number: 5,692,119
[45] Date of Patent: Nov. 25, 1997

[54] MANAGEMENT METHOD FOR A MULTIPROCESSOR SYSTEM

[75] Inventors: Yukio Koguchi; Nobuyuki Suzuki, both of Yokohama; Toyojiro Hayashi, Hadano, all of Japan

[73] Assignee: Hitachi, Ltd., Tokyo, Japan

[21] Appl. No.: 865,330

[22] Filed: Apr. 8, 1992

[30]     Foreign Application Priority Data

Apr. 10, 1991 [JP] Japan .................................. 3-077571

[51] Int. Cl.$^6$ ............................................ G06F 11/00
[52] U.S. Cl. .......................... 395/182.02; 395/183.01; 395/183.17; 395/182.11; 364/228.3; 364/228.1
[58] Field of Search ............................ 364/200, 132, 364/228.3, 228.1; 395/650, 700, 182.02, 183.01, 183.17, 182.11; 370/85.1

[56]                 References Cited

U.S. PATENT DOCUMENTS

| | | | |
|---|---|---|---|
| 4,149,243 | 4/1979 | Wallis | 364/200 |
| 4,484,273 | 11/1984 | Stiffler et al. | 364/200 |
| 4,608,631 | 8/1986 | Stiffler et al. | 364/200 |
| 4,807,228 | 2/1989 | Dahbura et al. | 371/9 |
| 4,831,518 | 5/1989 | Yu et al. | 364/200 |
| 4,918,589 | 4/1990 | Floro et al. | 364/132 |
| 4,945,470 | 7/1990 | Takahashi | 364/200 |
| 5,023,779 | 6/1991 | Federico et al. | 364/200 |
| 5,033,047 | 7/1991 | Vehara | 371/8.2 |
| 5,274,809 | 12/1993 | Iwasaki et al. | 395/650 |
| 5,291,489 | 3/1994 | Morgan et al. | 370/85.1 |

OTHER PUBLICATIONS

"The Computer Glossary", Fifth Edition, By; Alan Freedman, 1991, Computer Language Corp. Inc.

Primary Examiner—Kevin A. Kriess
Assistant Examiner—Majid A. Banankhah
Attorney, Agent, or Firm—Antonelli, Terry, Stout & Kraus LLP.

[57]                  ABSTRACT

The number of instruction processors to be independently allocated to each supervisor is limited to a level at which the performance of the tightly coupled multiprocessor system is not deteriorated. A plurality of independent tightly coupled multiprocessor systems comprising these supervisors and a plurality of instruction processors are provided to improve their processing capacity. Since the existence of a plurality of supervisors complicates the management of these supervisors, a supervisor for a total managing service to which separate instruction processors are independently allocated is provided. This supervisor for a total managing service executes initialization and termination of the supervisors and monitoring of a fault, to thereby integrally manage the plurality of supervisors and the on-line control programs under their control. The supervisor manages the resources such as the main storage, the instruction processor and the input/output processors to utilize or manage the CPU's through the management terminals. The supervisor for total managing service, or operation supervisor, manages the status or faults of the supervisor and on-line control programs and provides change-over commands for the on-line control programs.

8 Claims, 18 Drawing Sheets

FIG. IA
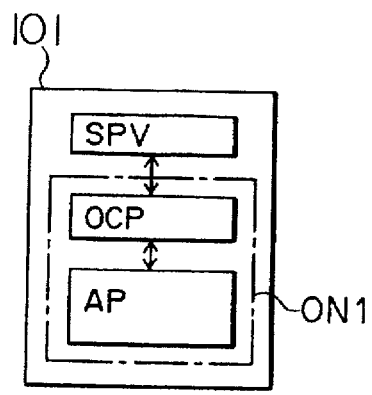
FIG. IB
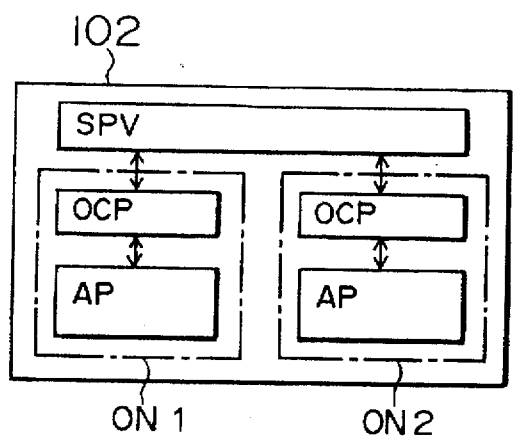
FIG. IC
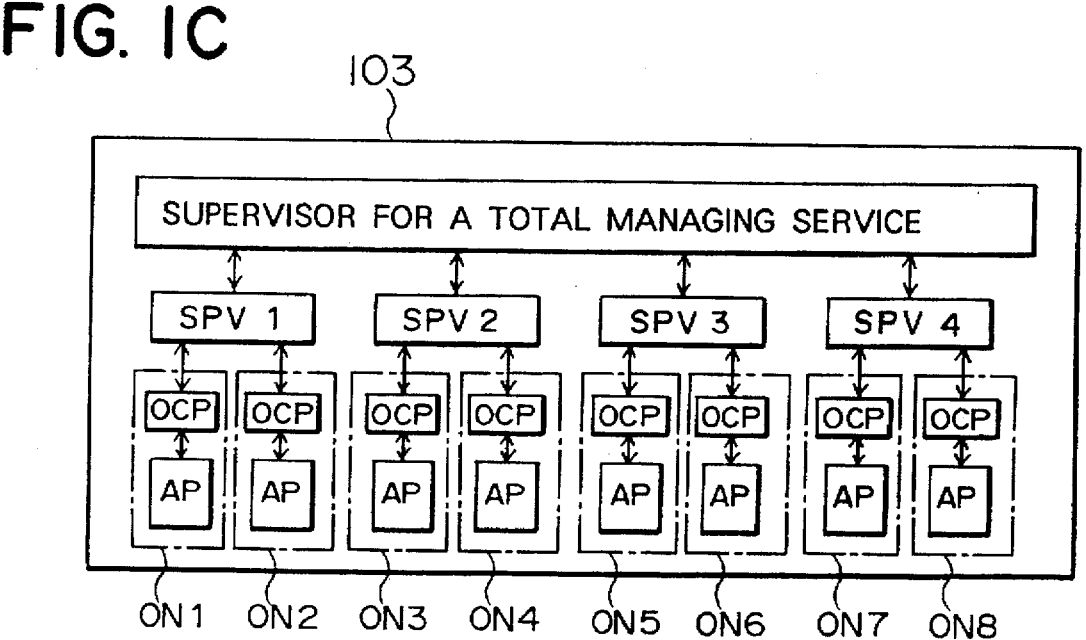

FIG. 2A

| SPV | IP 0 ~ 3 |
|---|---|
| ON | IP 0 ~ 3 (ON 1) |

| SPV | IP 0 ~ 7 | |
|---|---|---|
| ON | IP 0 ~ 3 (ON 1) | IP 4 ~ 7 (ON 2) |

| SUPERVISOR FOR A TOTAL MANAGING SERVICE | IP 0 ~ 1 | | | | | | | |
|---|---|---|---|---|---|---|---|---|
| SPV | IP 2 ~ 9 | | IP 10 ~ 17 | | IP 18 ~ 25 | | IP 26 ~ 33 | |
| ON | IP 2~5 (ON 1) | IP 6~9 (ON 2) | IP 10 ~13 (ON 3) | IP 14 ~17 (ON 4) | IP 18 ~21 (ON 5) | IP 22 ~25 (ON 6) | IP 26 ~29 (ON 7) | IP 30 ~33 (ON 8) |

203

MESSAGE WITHIN NETWORK

MESSAGE WITHIN LAN

| DEVICE NAME | ADDRESS |
|---|---|
| 704 | 04 |
| 761 | 61 |
| 771 | 71 |
| ⋮ | |

| NODE NAME | ADDRESS |
|---|---|
| 721 | 21 |
| 722 | 22 |
| ⋮ | |

FIG. 11

| ON-LINE SYSTEM NAME | SUPERVISOR NAME | ADDRESS | NODE NAME |
|---|---|---|---|
| 713 | 712 | 13 | 723, 724 |
| 715 | 714 | 15 | 721, 722 |
| | | | |

OWN-SYSTEM SUPERVISOR TABLE 1201

| SPV | STATUS | ADDRESS |
|---|---|---|
| 712 | R | 12 |
| 714 | R | 14 |

OTHER SYSTEM TABLE 1202

| SUPERVISOR FOR A TOTAL | STATUS | ADDRESS |
|---|---|---|
| 731 | R | 31 |

ON-LINE TABLE 1203

| ON | STATUS | BACK-UP CHAIN | ATTRIBUTE |
|---|---|---|---|
| 713 | R | 733 | 711 |
| 715 | R | 734 | 711 |
| 733 | B | — | 731 |
| 734 | B | — | 731 |

FIG. 17A

| SYATEM | CURRENT OPERATING ON-LINE SYSTEM | ADDRESS |
|---|---|---|
| 1 | 713 | 13 |
| 2 | 715 | 15 |

| SYSTEM | CURRENT OPERATING ON-LINE SYSTEM | ADDRESS |
|---|---|---|
| 1 | 733 | 33 |
| 2 | 734 | 34 |

~1701

MANAGEMENT METHOD FOR A MULTIPROCESSOR SYSTEM

BACKGROUND OF THE INVENTION

The present invention relates to a supermultiplex multiprocessor system for realizing high performance in an ultrahigh-speed main frame.

There has recently been a large demand for a large-scale data base server in a large-scale on-line system wherein; distributed processings and down-sizing of the computer are sought as well.

With the above background, there have been remarkable developments both in high integration of semiconductor devices to achieve high-speed operation and in element technology for high speed operation. However, there is a barrier in production technology and mounting technology for producing a system which use these devices. Further, technology for improving processing speed of instructions with a single processor have almost come to a limit. Accordingly, in order to realize an ultrahigh-speed on-line system with a remarkable improvement from the current level of processing speed, there is currently no other way than having a multiprocessor configuration.

The following methods are currently available to realize a high-performance system by using a multiprocessor structure.

(1) Increasing the Number of Central Processing Units (CPU)

This will be explained with reference to FIGS. 19A and 19B. An old system (1900) is structured by one CPU (1901) and one control and management terminal (1902). In the drawings, MS designates a main storage, IP designates an instruction processor and IOP designates an input/output processor. On the other hand, an expanded system (1910) is structured by two CPUs (1911, 1921), two applicational management terminals (1912, 1922) and communication units (1913, 1923) for communicating between the CPUs by communication lines. According to this system, the number of these units can be increased in line with a required capacity. In the above-described expanded system, the software configuration within the CPU is the same for all of the CPUs. However, as the number of CPUs in the system increases, there arises a problem of an increase in the complexity of both mutual communication overhead and system application.

(2) Increasing the Number of Instruction Processors (IP) Within One CPU

This will be explained with reference to FIGS. 20A and 20B. As shown in FIG. 20B, an expanded system (2010) is a so-called tightly coupled multiprocessor system (TCMP). According to this system, the number of an applicational management terminal (2002) is equal between an old system (2000) and the expanded system (2010), so that complexity of the operation can be avoided.

However, the more the multiplicity of multiprocessors increases, generally the more performance deterioration of hardware and software increases. Thus, there is a problem that improved performance which matches the increased level of complexity cannot be expected. This will be explained later.

FIG. 21 shows a central processing unit of a single processor. The CPU consists of a main storage 2110, a system controller 2120, an input/output processor 2130, a cache memory 2140 and an instruction processor 2150. The basic operation for the execution of an instruction is as follows. A group of instructions stored in the main storage 2110 are transferred to the cache memory 2140 of high-speed operation through the system controller 2120 before these instructions are executed. The instructions are executed by the cache memory 2140 and the instruction processor 2150. When an instruction to be executed already exists in the cache memory 2140, this instruction is executed at high speed. The input/output processor-2130 inputs and outputs data of external storage units to and from the main storage 2110 through the system controller 2120.

FIG. 22 shows a central processing unit of a multiprocessor configuration having two instruction processors 2251 and 2252. The principle of executing the instruction is the same as the one explained for FIG. 21. However, in the case of a structure having a plurality of instruction processors, a wait time for accessing the main storage 2110 increases between a plurality of instruction processors (2251, 2252) as described below. When each of the instruction processors (2251, 2252) is going to execute instructions, the corresponding group of instructions are transferred to the respective cache memory (2140) from the main storage 2110, and then the instructions are executed. When the same instructions in the main storage area are to be executed and the main storage area is to be updated, it is necessary to proceed with the execution of the instructions by setting the content of the respective cache memory (2140) to be the same. The time required for this operation mutually reduces the speed of executing the instructions. Further, when the volume of data to be input to and output from the main storage 2110 through the input and output processor 2130 becomes large, the throughput of the system controller 2120 is interrupted, with a result that the wait time for the plurality of instruction processors (2251, 2252) to access the main storage 2110 increases. Thus, the speed of executing the instructions is reduced. This level of speed reduction becomes worse when the frequency of accessing the main storage 2110 increases and when the number of instruction processors increases.

FIG. 23 shows a software configuration in an on-line system. The system consists of a supervisor 2370, an on-line control program 2360 and application program spaces 2301 to 2350. The on-line control program (OCP) is provided to manage a plurality of an application programs. FIG. 23 shows an example of the case where fifty application program spaces are provided to execute fifty multiplex operations of application program.

When an on-line program is to be operated in a multiprocessor structure, it is necessary to set by lock control such that only one instruction processor at a time can update a table where there is a risk of causing a contradiction when a plurality of instruction processors simultaneously update the same table within the main storage. This lock control is necessary for both of the supervisor 2370 and the on-line control program 2360. As the number of instruction processor increases, overhead of the lock control and a wait time required for releasing the lock increase, so that performance of the software is more aggravated. When the number of instruction processors is increased further in an attempt to obtain higher performance of the system, the scale of the system becomes unavoidably larger, with an increase in the number of entry of control tables within the supervisor 2370 and the on-line control program 2360 and an increase in the overhead for searching the control tables. As a result, software performance is aggravated more.

A relevant technology has been reported, for example, in the JP-A No. 61-210470.

Summarizing the above, there is the method of increasing the level of multiplicity of processors in a CPU and the method of increasing the number of CPUs, to meet the demand for expanding the transaction processing capacity of a large-scale on-line system. Each of these methods has the following problems to be solved.

(1) The Method of Increasing the Number of CPUs

As shown in FIGS. 19A and 19B, when the number of CPUs is increased to expand the transaction processing capacity, operation management terminals need to be increased by the number of the CPUs, which interferes with the integration of the operation and increases manpower cost due to the increase in the number of operations.

(2) The Method of Increasing the Multiplicity of Processors Within the CPU

Integration of operation can be maintained. However, with an expansion of the number of processors, bottleneck of the system occurs in both hardware and software, with a result that the effect of a level of increased multiplicity cannot be obtained. In other words, contention of an access to the main storage occurs in the hardware and contention of locking to the same resource occurs in the software.

SUMMARY OF THE INVENTION

It is an object of the present invention to solve the above problems.

The present invention provides a multiprocessor system including at least one supervisor to which a plurality of instruction processors are independently allocated respectively, a supervisor for a total managing service to which separate instruction processors are allocated independently to initialize and terminate the at least one supervisor and to monitor an occurrence of a fault of the supervisors, and a transmission path for connecting independent processors for carrying out communications between the supervisor for a total managing service and the supervisors.

The supervisor, in this case, is also called an operating system which is a control program existing between the hardware and the user program (a problem program). The supervisor for a total managing service is a control program for exclusively carrying out the above-described control and management by the operating system and the problem program.

BRIEF DESCRIPTION OF THE DRAWINGS

FIGS. 1A and 1B are diagrams for showing examples of the software configuration according to the prior-art technique and the present invention respectively;

FIG. 1C is a software configuration utilized in the present invention;

FIGS. 2A and 2B are diagrams for showing examples of mapping an instruction processor and a software structure according to the prior-art (FIGS. 2A–2B) technique and the present invention (2C) respectively;

FIG. 11 is a diagram for showing a format of an on-line address management table;

FIG. 12 is a diagram for showing a format of a management table within a supervisor for a total managing service;

FIGS. 17A and 17B are diagrams for showing examples of a structure of a current on-line management table at a terminal;

DESCRIPTION OF THE PREFERRED EMBODIMENTS

Figure 3:
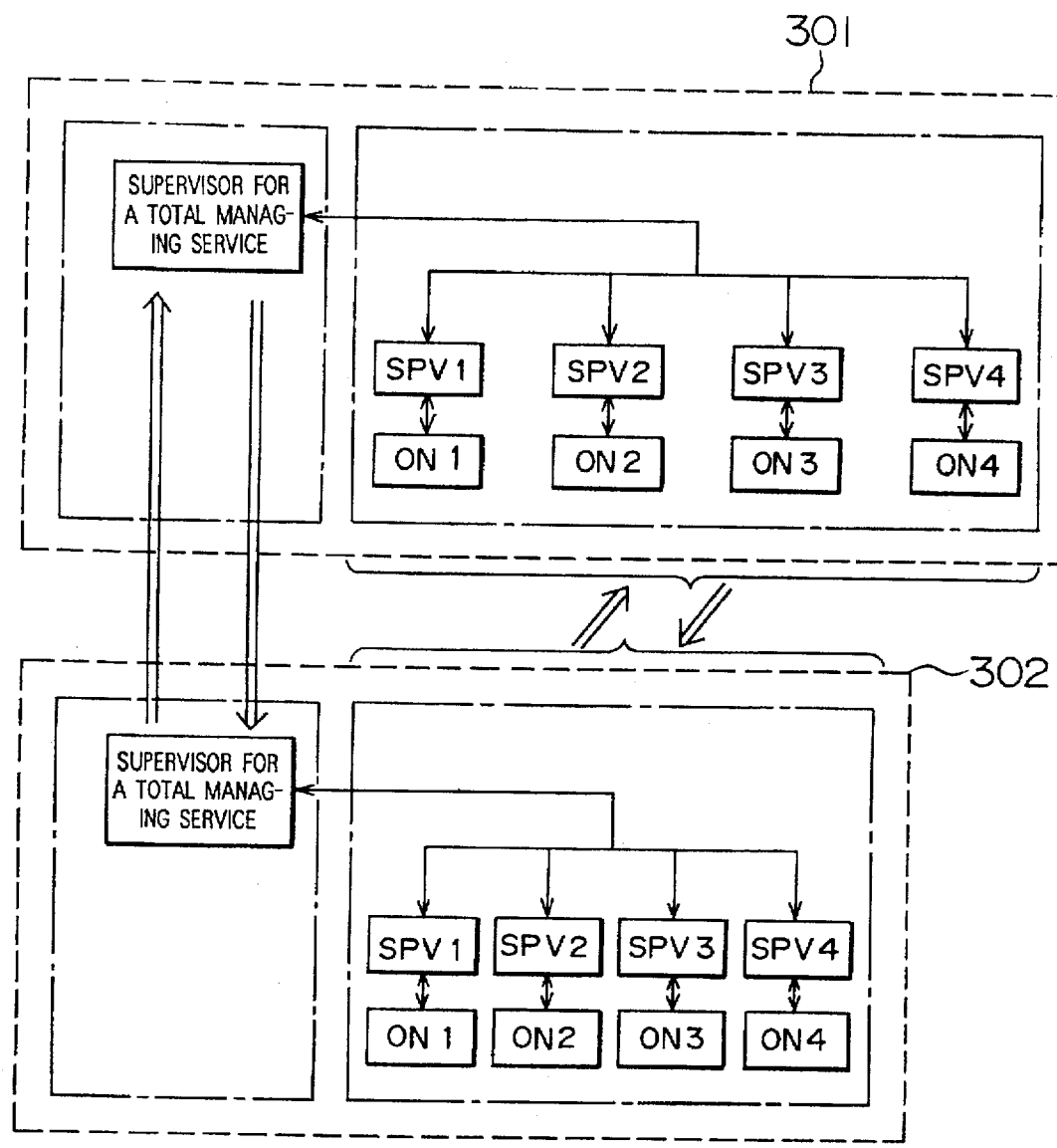
FIG. 3 is a diagram for showing the concept of a change-over system between a current operating system and a stand-by system.
Figures 4A, 4B:
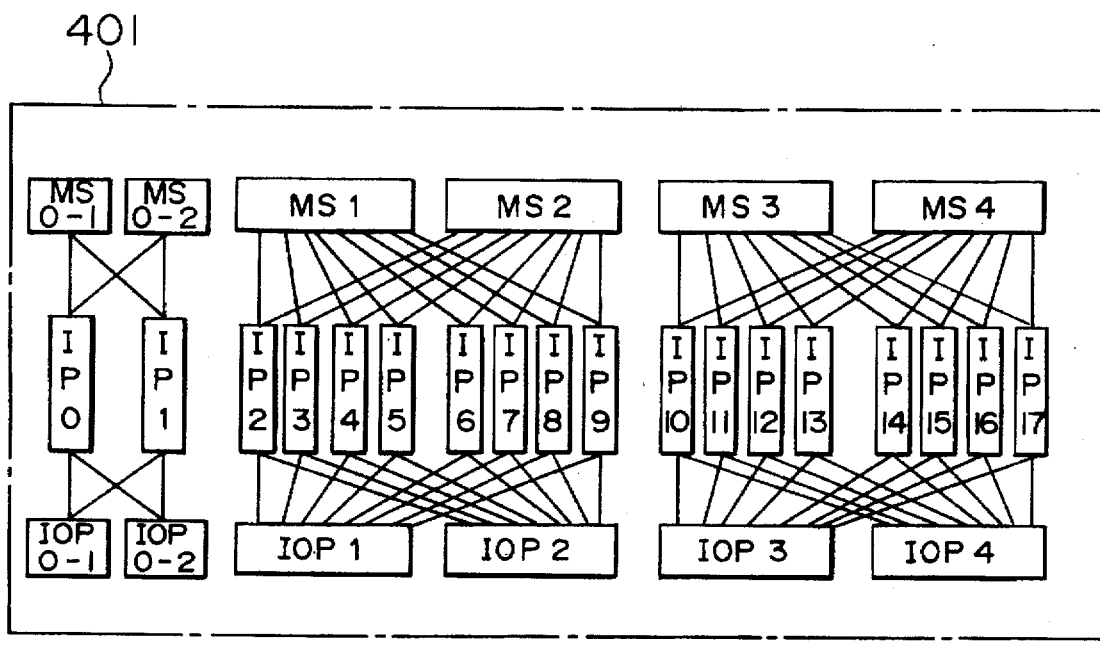
FIGS. 4A and 4B are diagrams for showing examples of mapping a currently-used hardware configuration and software.

Embodiments of the present invention will be explained with reference to the drawings.

Referring to FIGS. 1A and 1B, 101 and 102 designate software structures of a multiprocessor system which can be achieved by the prior-art technique. In a multiprocessor system with a small level of multiplicity of instruction processors, an increase of overhead due to lock control of a supervisor (SPY) and an on-line control program (OCP), an increase of time for waiting for a lock release and an increase of overhead due to an increase of a system scale all have affect little to deteriorate software performance. Thus, the system can bear for a practical application without extremely lowering the system operation. However, there is a limit to lock control of the control program. Generally, lock control of the on-line control program comes to a limit earlier than lock control of the supervisor. In this case, a limit to the lock control of the on-line control program can be avoided by taking a multi-on-line configuration having a plurality of on-line control programs in a software configuration 102 shown in FIG. 1B. In FIG. 1B, ON1 and ON2 indicate that two on-line systems exist. However, in this structure, it is impossible to avoid a limit of the lock control of the supervisor.

FIG. 1C shows a software configuration according to the present invention. In a supermultiplex multiprocessor system with a high level of multiplicity of instruction processors, supervisors also take a plurality of multi-on-line structures. A supervisor for a total managing service is provided which can collectively control the plurality of supervisors and the subsequent programs and which can integrally control system operation.

Referring to FIGS. 2A and 2B, 201 and 202 respectively show an allocation of instruction processors and a software configuration in a multiprocessor system which can be achieved by the prior-art technique (101 and 102 in FIGS. 1A and 1B respectively correspond to 201 and 202 in FIGS. 2A and 2B respectively). When the number of instruction processors is increased with the system of the allocation 202 as it is, the on-line control programs and the subsequent programs are allocated by being scattered into a plurality of instruction processor groups. Accordingly, although deterioration of hardware performance can be restricted to a predetermined value, deterioration of the supervisor accelerates the deterioration of the hardware performance as the number of instruction processors increases because the supervisor uses all of the instruction processors.

FIG. 2C shows an allocation system of the software configuration and the instruction processors (IP) according to the present invention. As an example of the allocation for an operation, IP 0–1 are allocated to a supervisor for a total managing service. IP 2–9, IP 10–17, IP 18–25 and IP 26–33 are allocated to normal supervisors 1–4 respectively, and IP 2–5, IP 6–9, IP 10–13, IP 14–17, IP 18–21, IP 22–25, IP 26–29 and IP 30–33 are allocated to on-lines 1–8. As explained above, the supervisor for a total managing service and the normal supervisors are allocated to the separate IP groups respectively.

FIG. 3 shows a concept of a system for changing over from a current operating system 301 to a stand-by system 302 or vice versa in a multiprocessor structured by four on-line systems including the current system 301 and the stand-by system 302. A dotted chain line shows a size of hardware resources to be allocated to a software structure element. The drawing shows the state that the hardware resources allocated to the four on-line systems are contracted when the hardware resources have been changed over from the current system to the stand-by system. Each supervisor for a total managing service loaded on the current system and the stand-by system respectively has functions of batch starting and ending of a plurality of respective on-line systems, a monitoring of the respective on-line systems and a display of automatic change-over from the current unit used for the respective on-line system to a back-up unit of the other system, a monitoring of the other on-line systems and a display of automatic change-over from the current unit used for other on-line system to a back-up unit of the respective system, a display of the state of the respective on-line system and the other on-line system, a display of an error of each respective on-line system, and indication and display of a command. With these functions, an integrated management of system operation becomes possible.

Figures 5A, 5B:
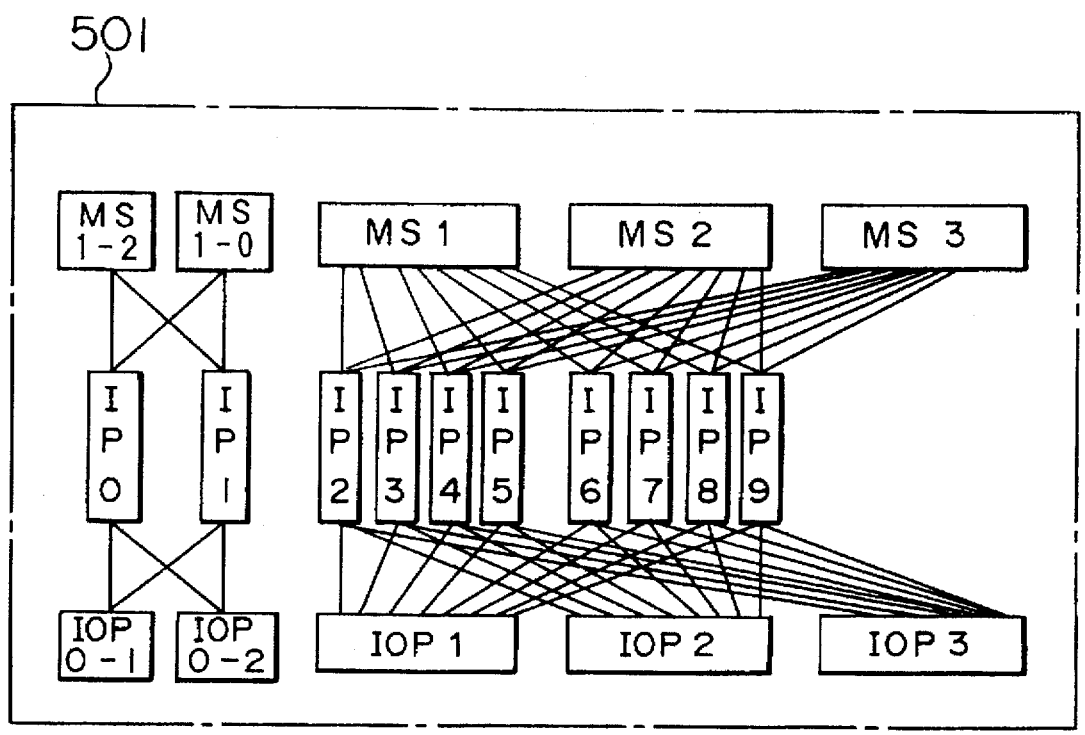
FIGS. 5A and 5B are diagrams for showing examples of mapping a stand-by hardware configuration and software.

FIGS. 4A and 4B and FIGS. 5A and 5B show hardware configurations 401 and 501 and mappings between the instruction processor and the software for the current system and the stand-by system, respectively. The hardware resources are grouped as shown in the hardware configurations 401 and 501 respectively and the software is mapped to each instruction processor as shown in the mappings 402 and 502, respectively. The multiprocessor system shown by the hardware configuration 501 in FIG. 5A is used as a stand-by system but this can be structured as a smaller-scale multiprocessor system with a small number of instruction processors than the current system shown by the hardware configuration 401 in FIG. 4A. This shows an example of the hardware configuration which enables two on-lines to be operative at the same time, that is a back-up operation of the ON1 and ON2 or ON3 and ON4, without reducing the processing capacity even in the busiest time zone of the system. During the normal time zone, data quantity becomes generally ½ to ⅓ of the data quantity in the busiest time zone, so that the back-up of the four on-line systems can be obtained in almost all of the time zones as shown in the mapping 502, to make it possible to build up an economic system. In this case, the hardware needs to have a hardware configuration control between the main storage, the instruction processors and the input/output processors, a contraction processing at the time of an occurrence of a fault in the instruction processors, the main storage and the input/output processors, and a large system console function which enables an integrated system operation.

Figure 6:
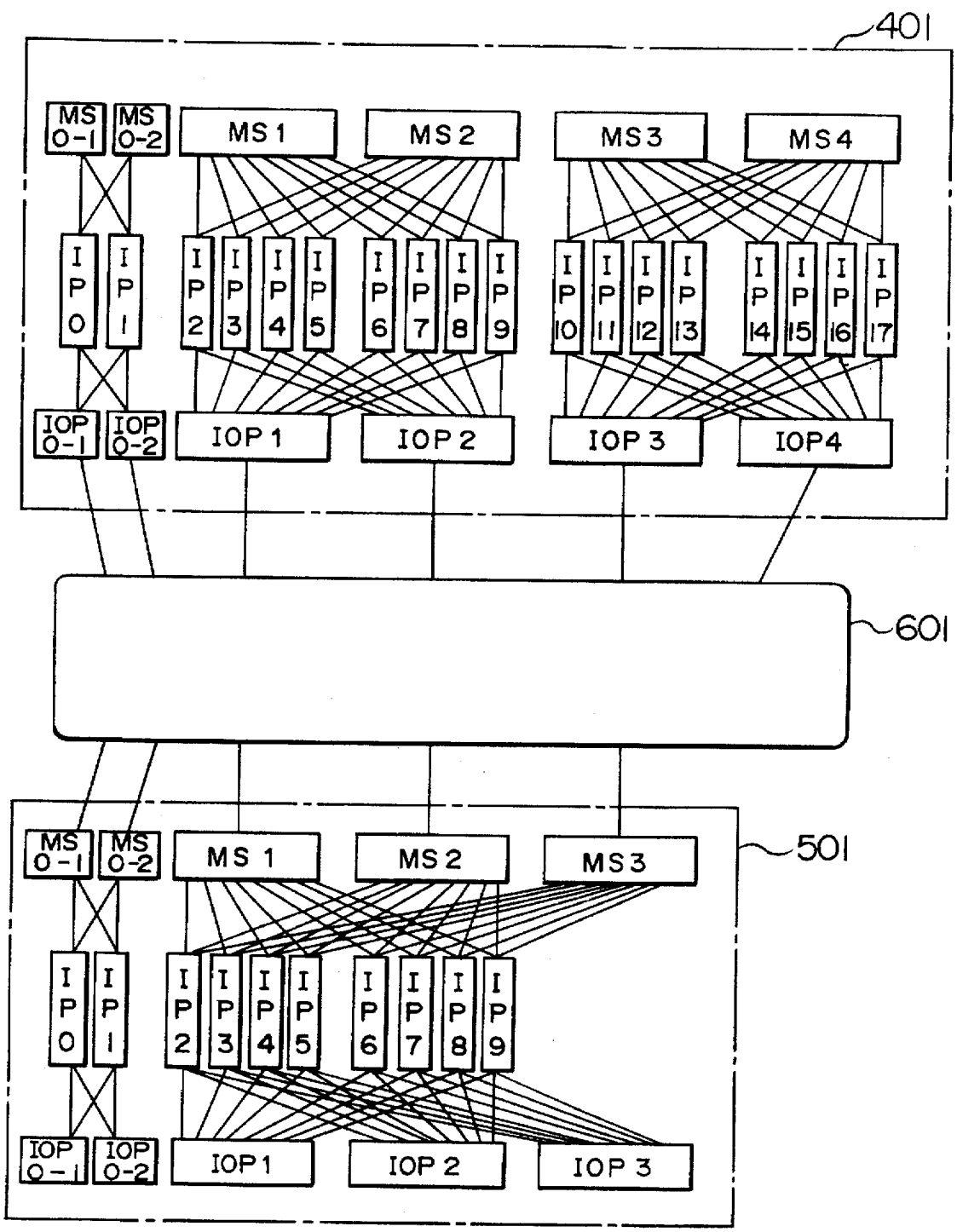
FIG. 6 is a hardware configuration diagram for connecting a currently-operating multiprocessor system and a stand-by multiprocessor system through a LAN.

FIG. 6 is a hardware configuration diagram showing a state that a current multiprocessor system and a stand-by multiprocessor system are connected together via a LAN (local area network). The hardware configuration 401 of the current operating system and the hardware configuration 501 of the standby system are connected together via an ultrahigh-speed LAN 601, and a supervisor for a total managing service for the current operating system and the stand-by system respectively is loosely coupled with the respective on-line systems.

A communication medium for connecting between the current system and the stand-by system is not limited to the LAN but this may be any communication medium which can transfer a data quantity required for system operation flowing between the system components.

Figure 7:
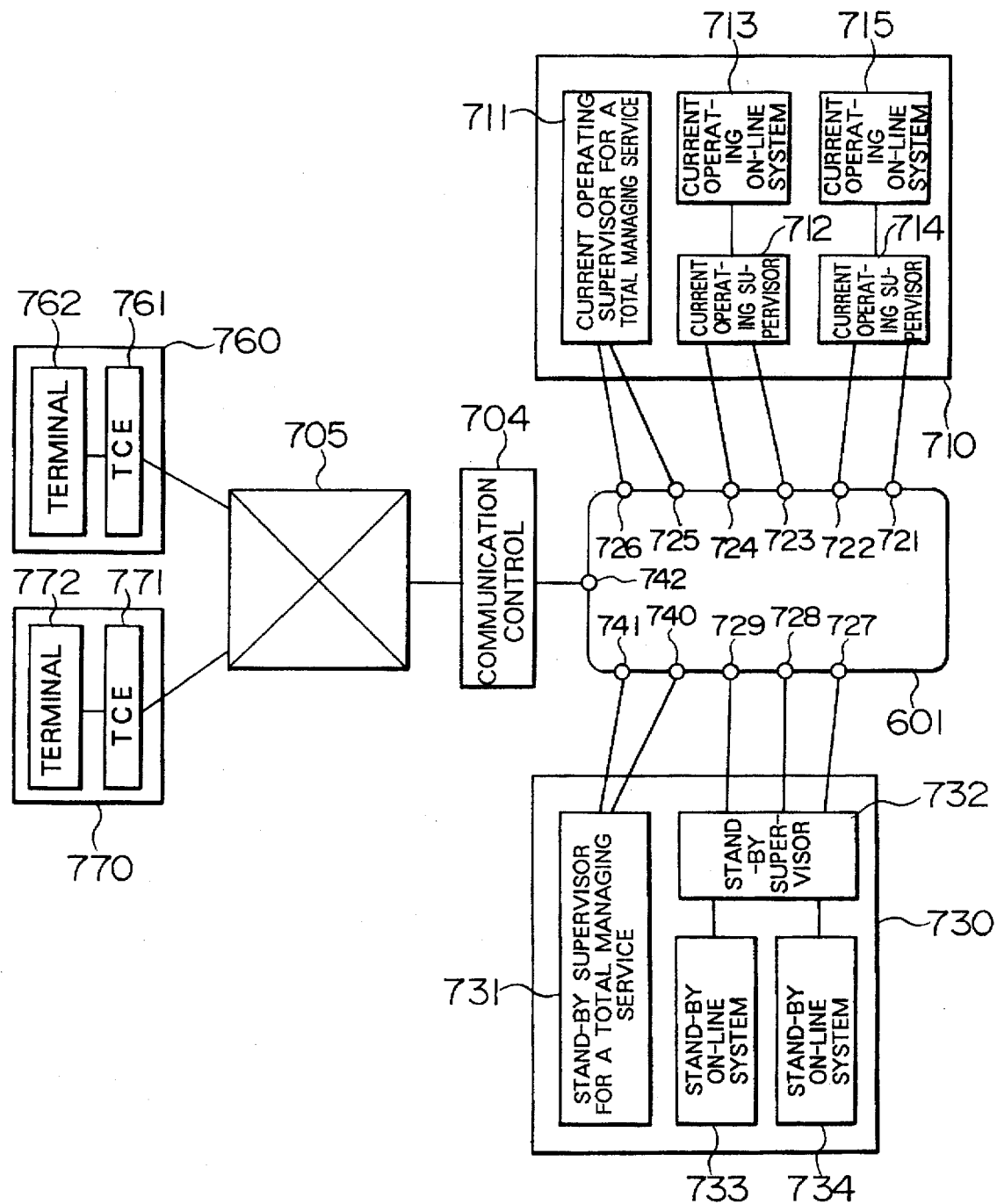
FIG. 7 is a system configuration diagram for showing an example of applying the system of FIG. 6 to a bank on-line system.

FIG. 7 shows an example of the case where the system shown in FIG. 6 is applied to a bank on-line system. The bank on-line system includes operating offices that are independent of each other, so that the system can be divided for each operating office. A current operating multiprocessor system 710 is structured by a current operating supervisor for a total managing service 711, current supervisors 712 and 714 and current on-line systems 713 and 715. The on-line systems 713 and 715 process transactions which arise in operating offices 760 and 770, respectively. A stand-by multiprocessor system 730 is structured in a similar manner, but only one stand-by supervisor 732 operates because of a contracted configuration of the multiprocessor system. On-line systems 733 and 734 are stand-by systems for the on-line systems 713 and 715, respectively. The multiprocessor systems 710 and 730 are connected to the LAN 601 respectively through nodes 721 to 729 and 740 to 741. Terminals 762 and 772 of the operating offices 760 and 770 are connected to the LAN 601 by a node 742 through terminal controllers 761 and 771 of the operating offices, a network 705 and a communication controller 704.

Figures 8, 9, 10:
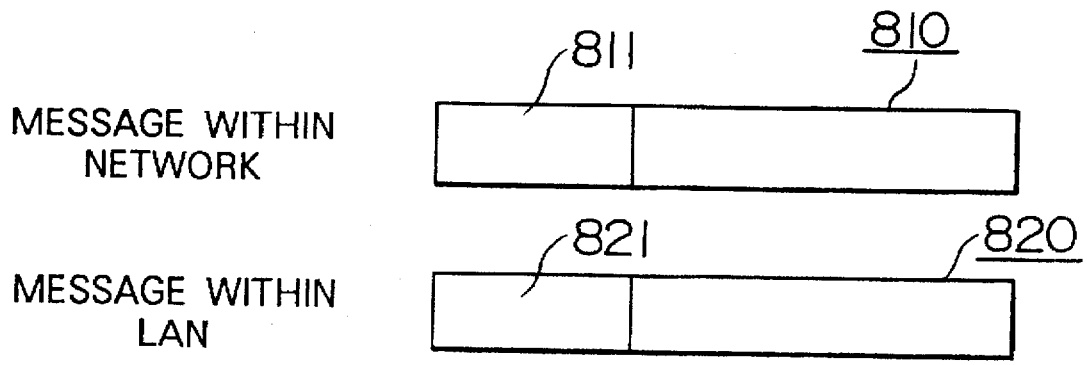
FIG. 8 is a diagram for showing formats of a message within a network and a message with a LAN respectively.
FIG. 9 is a diagram for showing a format of an address conversion table within a network.
FIG. 10 is a diagram for showing a format of an address management table within a LAN.

FIG. 8 shows a header of a message to be transmitted through the network 705. A header 811 within the network is set in a message within the network. The header 811 is either set or deleted in each of the communication controller 704 and terminal controllers 761 and 771. For this purpose, an address management table within the network shown in FIG. 9 is set within the communication controller 704 and the terminal controller 761 and 771, respectively. The table shows an address within the network corresponding to the other system, and this address is set to the header 811. A header 821 within the LAN is set in a message 820 within the LAN. The header 821 is either set or deleted in each of the communication controller 704, the supervisor for a total managing service 711, the supervisors 712 and 714, the supervisor for a total managing service 731 and the supervisor 732. For this purpose, an address management table within the LAN shown in FIG. 10 is set in each system. The table shows an address within the LAN corresponding to the other node, and this address is set to the header 821.

Description will be made of a flow of a message from the operating office 760 to the current on-line system 713 during the normal operating time. A message input from the terminal 762 in FIG. 7 is collected by the terminal controller 761, added with the header 811 shown in FIG. 8, and is then sent to the network 705. The network 705 delivers the message to the communication controller 704 based on the header 811. The communication controller 704 adds the header 821 to the message and sends the result to the LAN 601. The LAN 601 delivers the message to the supervisor 712 based on the header 821. The supervisor 712 further sends the message to the on-line system 713. When a message is to be sent from the on-line system 713 to the terminal 762, the message is transmitted through a route opposite to the above.

A transmission of a message between the current operating systems is as follows. FIG. 11 shows an on-line address management table. When it is necessary to transmit a message from an on-line system 713 to an on-line system 715, the on-line system 715 requests a message transmission to an address 15 defined in current operating supervisors 712 and 714. By referring to the address management table, the supervisor 712 can know that the address 15 exists in the supervisor 714, and accordingly selects a node 721 or 722 to send the message to the supervisor 714. The selection of the node is carried out by an algorithm which causes no unilateral utilization of the node. The supervisor 712 adds to the message the header 821 having the LAN address 21 or 22 in accordance with the LAN address management table shown in FIG. 10, and sends the result to the node 721 or 722. The node 721 or 722 sends the message to the supervisor 714. The supervisor 714 then sends the message to the on-line system 715. The number of the communication controllers 704 can be increased to a required level when necessary.

Operation of the supervisor for a total managing service will be explained by taking an example of the supervisor for a total managing service 711, with reference to FIGS. 12 to 16.

FIG. 12 shows a structure of the management table within the supervisor for a total managing service. 1201 designates a supervisor table for the respective system, and R in a status column designates running. When a fault has been detected in the operating or running supervisor, the status of R is changed, for example, to F. The address shows an address within the LAN. 1202 designates a table of the other system, and the status and the address of this table have a similar meaning to the one in the respective system supervisor table 1201. 1203 designates a table relating to the on-line system, and R and B in a status column designate running and back-up, or stand-by, respectively. A back-up chain shows an on-line system which operates as an alternate when the current on-line system has caused a fault. An attribute shows a supervisor for a total managing service from which the on-line system receives control.

The supervisor for a total managing service 711 initializes or ends the multiprocessor system 710 for the purpose of managing the application of the total system. By referring to the respective system supervisor table 1201, the supervisor for a total managing service 711 confirms the status of the supervisor when an initialization command is to be input from the control and management terminal (not shown), and initializes the supervisor which has not yet been started and executes an initial program loading. When a termination command has been input from the application management terminal, the status is confirmed similarly and a stop request is made to the current operating supervisor.

Figure 13A:
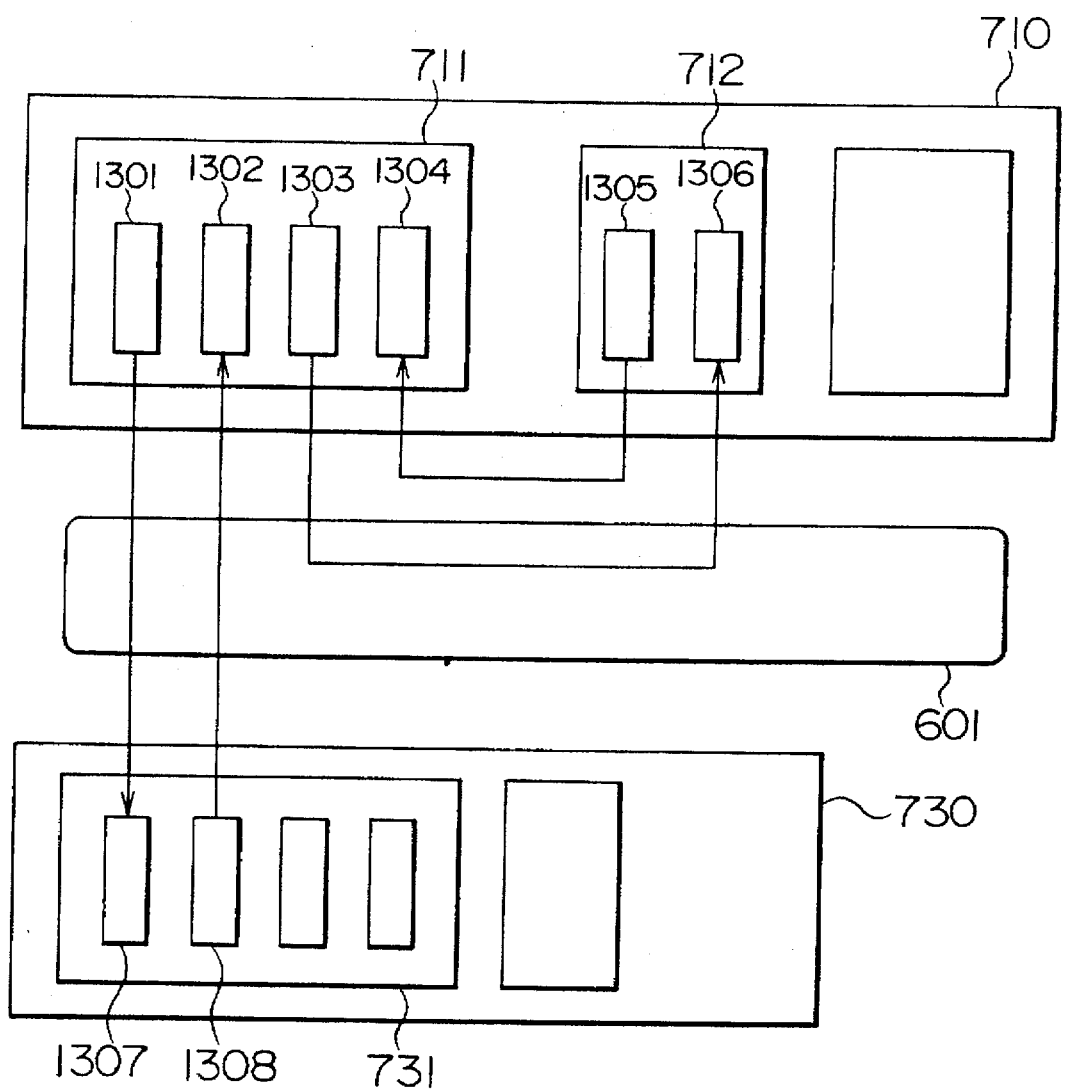
FIGS. 13A and 13B are diagrams for showing a communication area between a supervisor for a total managing service and a supervisor, and a message structure respectively.

The monitoring system during a normal operating time will be explained below with reference to FIGS. 13A, 13B, 14, 15 and 16. For the sake of convenience, description will be made, as an example, of the case where a message is transmitted between the supervisor for a total managing service 711, the supervisor 712 and the supervisor for a total managing service 731. FIG. 13A shows communication areas 1301 to 1308 to be used when the supervisor for a total managing service 711 transmits and receives a message between the supervisor 712 and the supervisor for a total managing service 731. Each communication area is secured on the main storage which can be directly accessed by the respective supervisor.

Figure 13B:
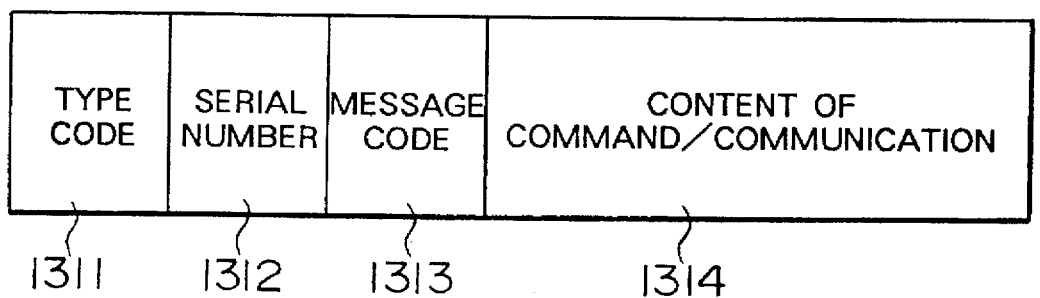

FIG. 13B shows a format of the message to be transmitted and received between the supervisors through the LAN 601. 1311 designates a type code for showing a transmission originator of the message. This code shows whether the transmission originator is a supervisor for total managing service or a supervisor of the respective system. 1312 designates a serial number for showing the sequence of a transmission message to be transmitted to the same destination, 1313 designates a message code for showing whether the message is a command/communication or a response, and 1314 designates a content of a command/communication to be transmitted by this message. The LAN header 821 is added to the message shown in FIG. 13B, and the result is transmitted as the intra-LAN message 820 within the LAN 601.

Figure 14:
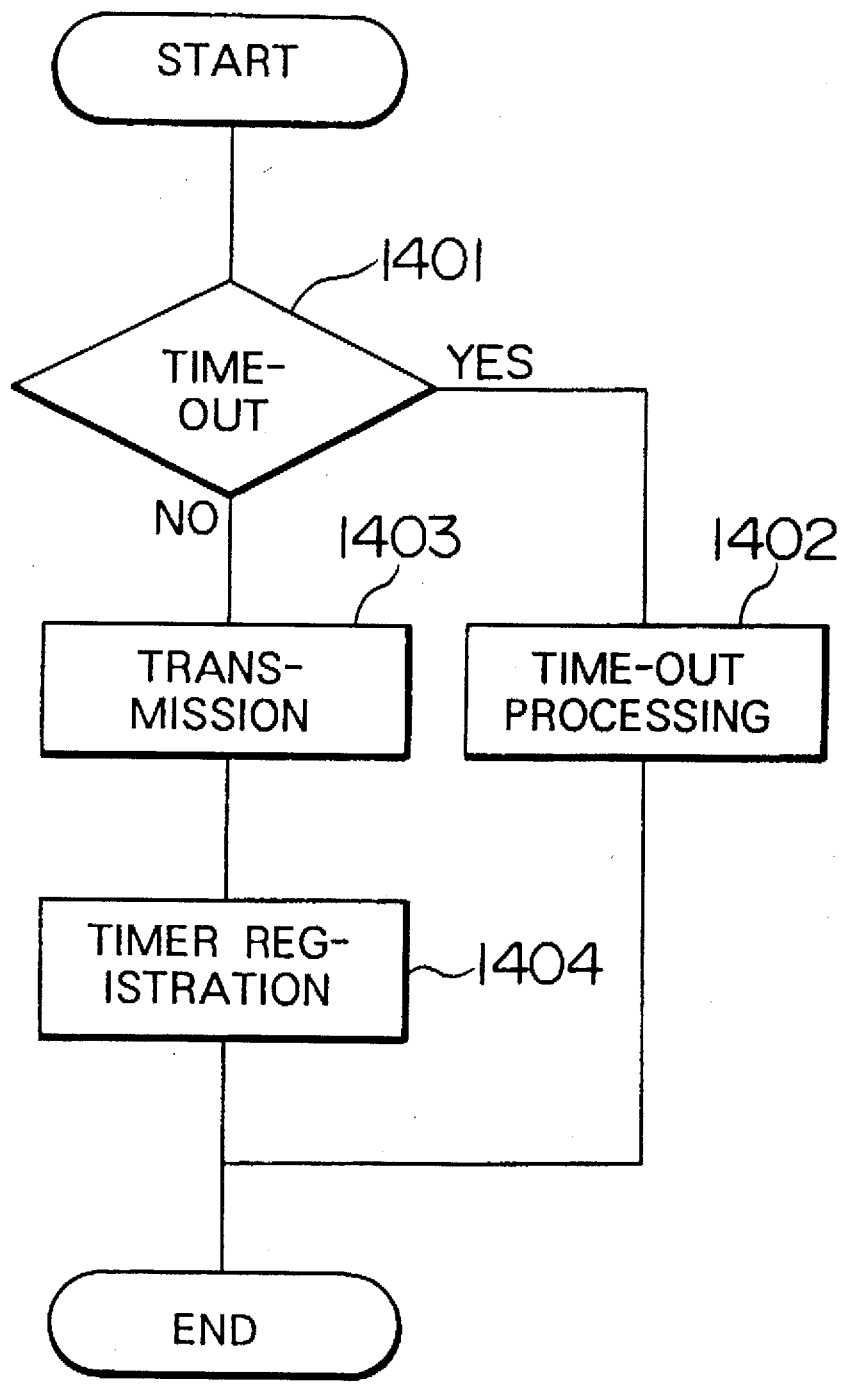
FIG. 14 is a flow chart for a transmission processing of a supervisor for a total managing service.

FIG. 14 shows a transmission process for making a transmission from the supervisor for a total managing service 711. The transmission processing is periodically started by the timer registration (Step 1404). When there has been no response from the supervisor 712 or the supervisor for a total managing service 731 even after a predetermined time since the transmission processing was started, a time-out occurs and a determination is made that a fault has occurred in the supervisor 712 or the supervisor for a total managing supervisor 731 (Step 1401), and a time-out processing is carried out (Step 1402). During a normal time, transmission processing is carried out (step 1403), and a timer registration is carried out again for a next opportunity (Step 1404).

When the supervisor for a total managing service 711 has detected a fault of the supervisor for a total managing service 731, the status of the supervisor for a table managing service 731 on the total 1202 is changed from R to F to display the fault at the application management terminal. When the supervisor for a total managing service 731 has detected a fault of the supervisor for a total managing service 711, the status of the supervisor for a total managing service 711 on the table 1202 is changed from R to F, the status of the on-line systems 713 and 715 on the table 1203 is changed from R to F, and the supervisor 732 is started. When the supervisor 732 has been started, the status of the supervisor 732 on the total 1201 is changed from B to R. Then, the supervisor for a total managing service 731 sends a command to the supervisor 732 to start the on-line systems 733 and 734. When the on-line systems 733 and 734 have been started, the status of the on-line systems 733 and 734 on the table 1203 is changed from B to R.

Figure 15:
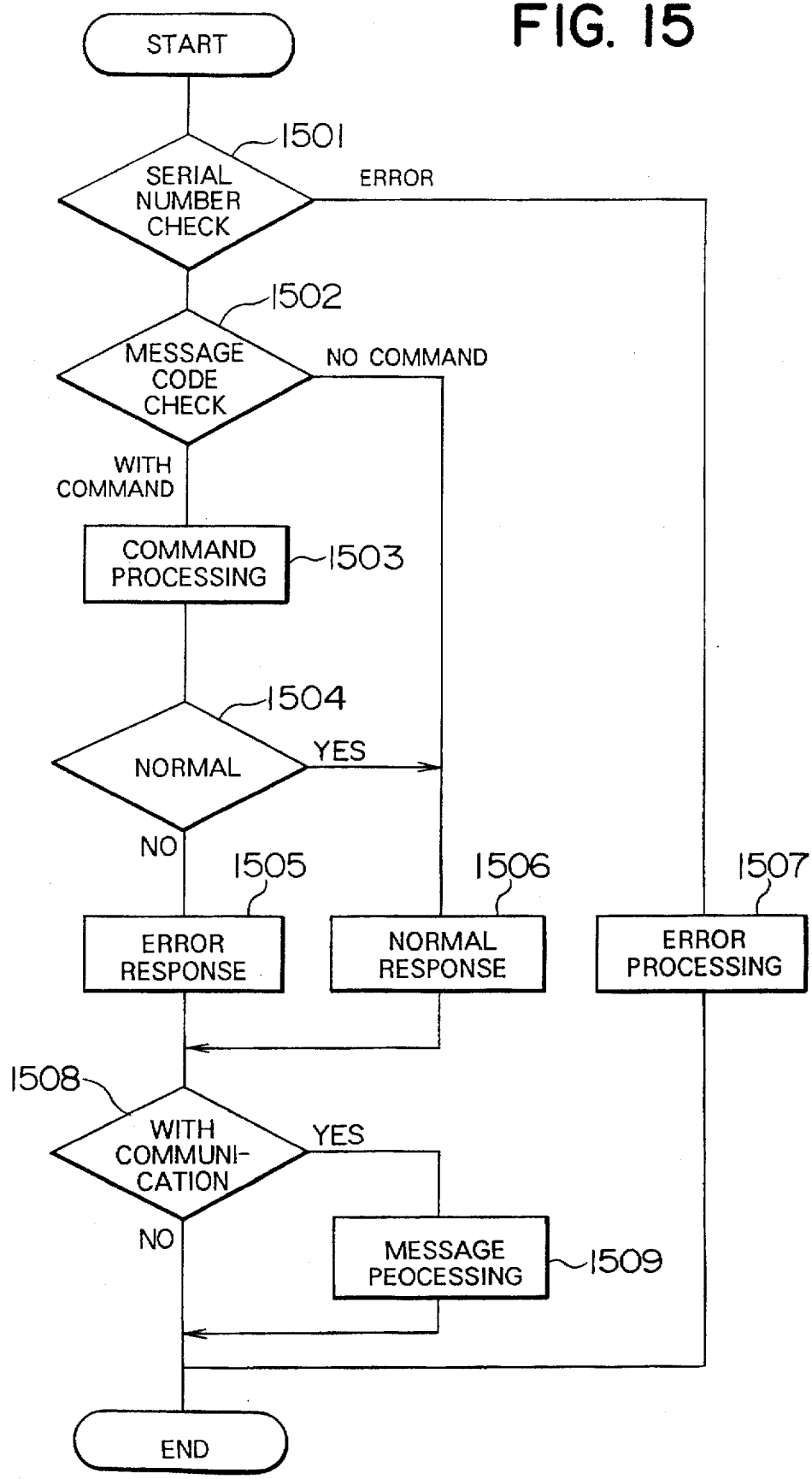
FIG. 15 is a flow chart for showing a flow of a message processing of a supervisor.

FIG. 15 shows a flow of the receive processing in the supervisor 712. When receiving a message, the supervisor 712 checks the serial number 312 (Step 1501), and executes an error processing when an error has occurred (Step 1507). During a normal time, the supervisor checks the message code 1313 (Step 1502) and returns only a normal response when there has been no special command (Step 1506). When there has been a special command such as for starting an on-line job, the supervisor 712 processes this command (Step 1503). When the command has been internally processed normally (Step 1504 Y), a normal response is produced (Step 1506). When an error has occurred, an error response is produced (Step 1505). When there is a message to be communicated, such as an on-line fault (Step 1508 Y), the message is produced (Step 1509). In other words, when a fault has been detected in the on-line system under the management, for example, the on-line system 713, a message having a communication content to this extent is produced and this message is passed to the supervisor for a total managing service 711. The supervisor for a total managing service 711 changes the status of the on-line system 713 on the table 1203 from R to F, and reports this effect to the supervisor for a total managing service 731 to which the on-line system 733 belongs in order to start the on-line system 733 which is a back-up destination of the on-line system 713. When the on-line system 733 has been started, the status of the on-line system 733 on the table 1203 is changed from B to R.

Figure 16:
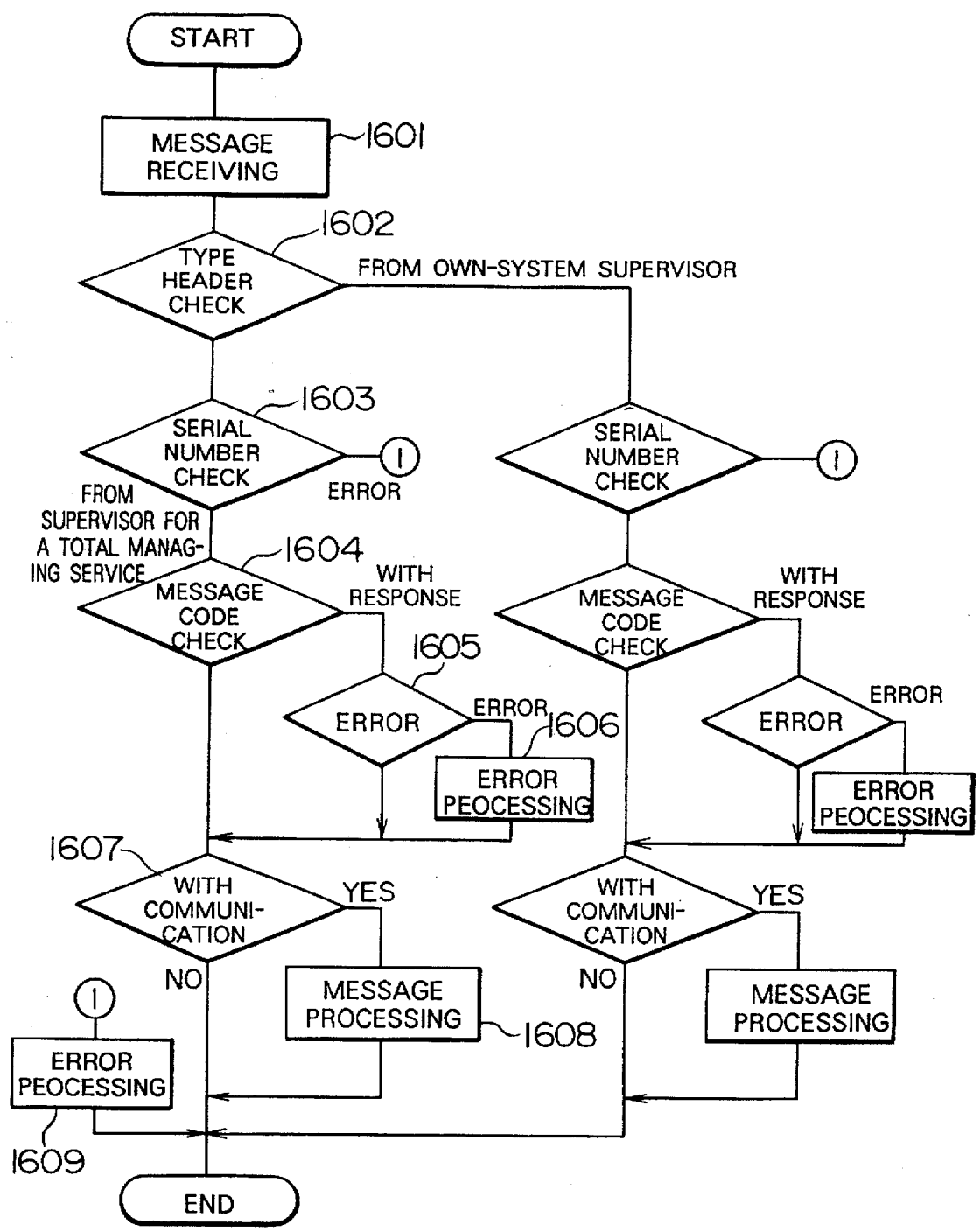
FIG. 16 is a flow chart for showing a flow of a receive processing of a supervisor for a total managing service.

FIG. 16 shows the receive processing in the supervisor for a total managing service 711. After receiving a message (Step 1601), the supervisor 711 checks the type code 1311 and makes a decision whether the type code 1311 is for the supervisor for a total managing service 731 or for the own-system supervisor 712 (Step 1602). If the message is from the supervisor for a total managing service, the supervisor 711 checks the serial number 1312 (Step 1603). When there is an error, an error processing is carried out (Step 1609), and during a normal time, the message code 1313 is checked (Step 1604). When there has been a response to the preceding transmission message, the return code is checked (Step 1605). When there is an error, an error processing is carried out (Step 1606). Next, the supervisor for a total managing service 711 checks for the presence or absence of a command/communication (Step 1607). When where is a command/communication, the content of the command/communication 1314 is processed (Step 1608). In the case of the respective system supervisor 712, a processing flow similar to the above is taken. The flow of receive processing of the supervisor for a total managing service 731 is also as shown in the drawing. When the supervisor for a total managing service 731 has received a message that a fault occurred in the on-line system of the other system, for example, the on-line system 713, the status of the on-line system 713 on the table 1203 is changed from R to F, and a command is sent to the supervisor 732 to start the on-line system 733 which is a back-up destination of the on-line system 713. Thereafter, the supervisor for a total managing service 731 monitors the status of the on-line system 733 through the supervisor 732 and reports the result to the supervisor for a total managing service 711, so that it is possible to integrally accept the status of the on-line system by the application management terminal of the supervisor for a total managing service 711.

As described above, when a fault has occurred in the current supervisor and the current on-line system, the supervisor for a total managing service detects this fault and reports the result to the stand-by supervisor for a total managing service 731 of the stand-by multiprocessor system 730. The supervisor for a total managing service 731 instructs the stand-by supervisor 732 to start the necessary stand-by on-line system as a current operating system.

The supervisors for a total managing service 711 and 731 mutually monitor each other. When the whole of the multiprocessor system 710, for example, is in fault, the supervisor for a total managing service 731 detects this fault and instructs the supervisor 732 to change over the on-line systems 733 and 734 for the current systems.

When the current on-line system 713 or 715 has been changed over to the stand-by on-line system 733 or 734 because of a fault, a message from the terminal needs to be transmitted to the stand-by on-line system. This is realized in the following manner. For example, when the on-line system 713 in FIG. 7 is in fault, a change-over message is sent from the on-line system 733 to the terminal controller 761 through the supervisor 732, the LAN 601, the communication controller 704 and the network 705. The terminal controller 761 has a management table 1701 for the current on-line systems as shown in FIGS. 17A and 17B. The management table 1701 is changed over from the state of FIG. 17A to the state of FIG. 17B based on the message from the on-line system 733. With the above arrangement, the current on-line system 733 enters the address part of the message header and thereafter the message can be transmitted to the stand-by multiprocessor system 730.

The types of messages passing through the LAN 601 include a message transmitted between the operating office and the current on-line system, a message transmitted between the current on-line systems and a monitoring message of a supervisor for a total managing service. For each of the messages, a message requesting system and a message processing system are arranged at a proportion of 1 to 1. It is required that the number of messages within the LAN 601 is reduced to a minimum to prevent the system of the LAN 601 from being bottle-necked.

It is possible to improve the performance of the multiprocessor system while maintaining the integrity of the operation as described below.

(1) Operation and Management

The supervisor for a total managing service makes it possible to execute an integral managing service even if the number of supervisors and on-line systems increases.

(2) Performance

Figure 18:
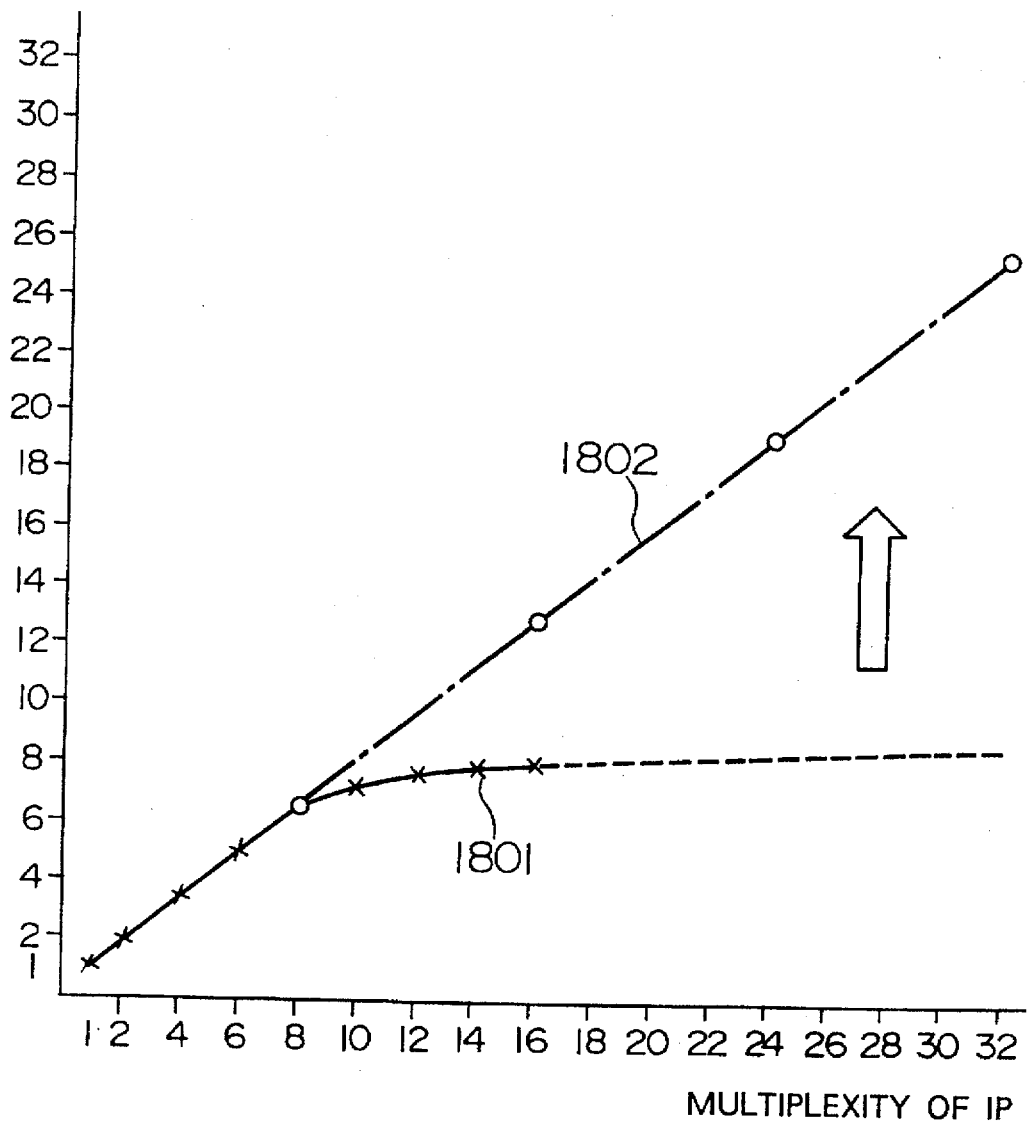
FIG. 18 is a diagram for showing an effect of system performance according to the present invention.
Figure 19A:
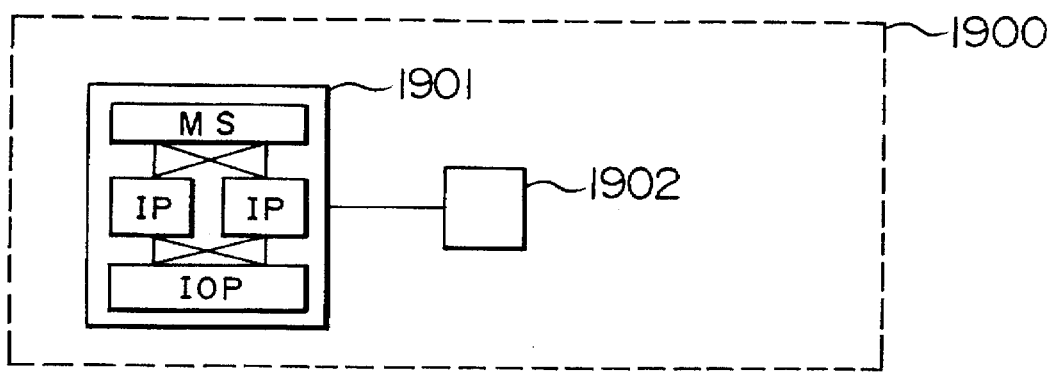
FIGS. 19A and 19B are configuration diagrams for showing an improvement of on-line processing capacity by an increase in the number of CPUs.
Figure 19B:
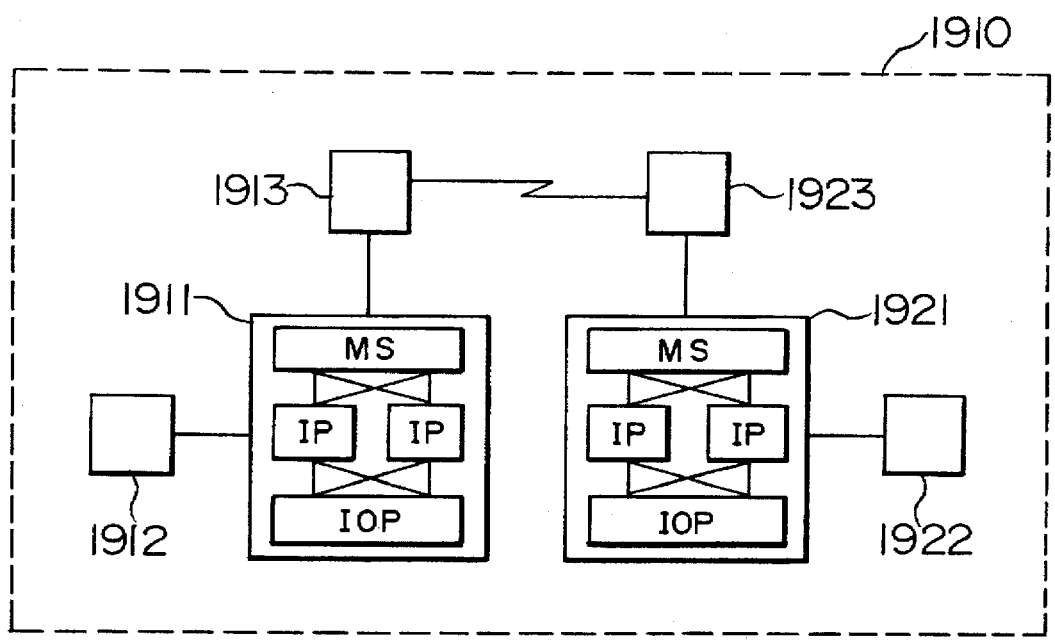
Figure 20A:
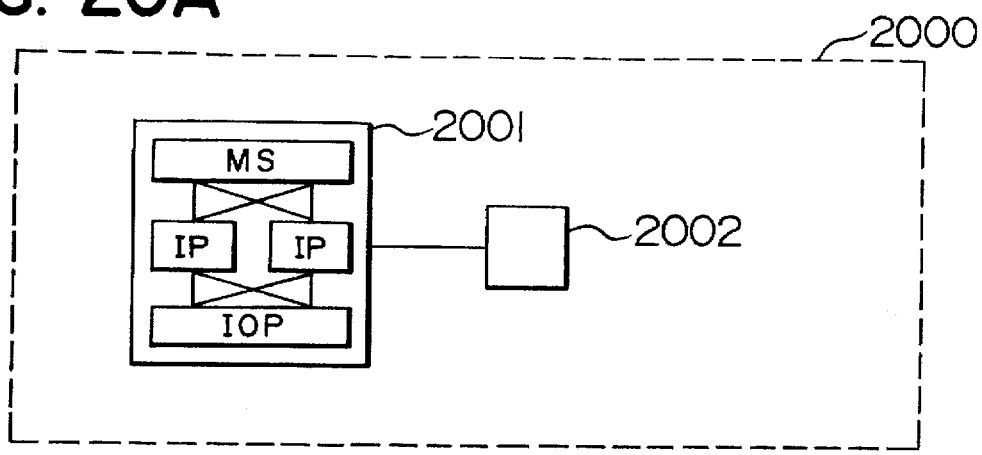
FIGS. 20A and 20B are configuration diagrams for showing a multiplex expansion of multiprocessors within a CPU.
Figure 20B:
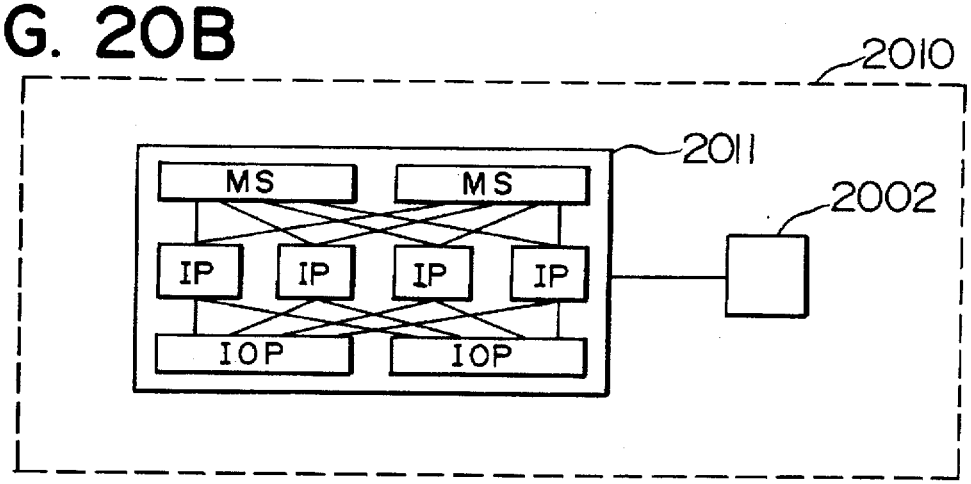
Figure 21:
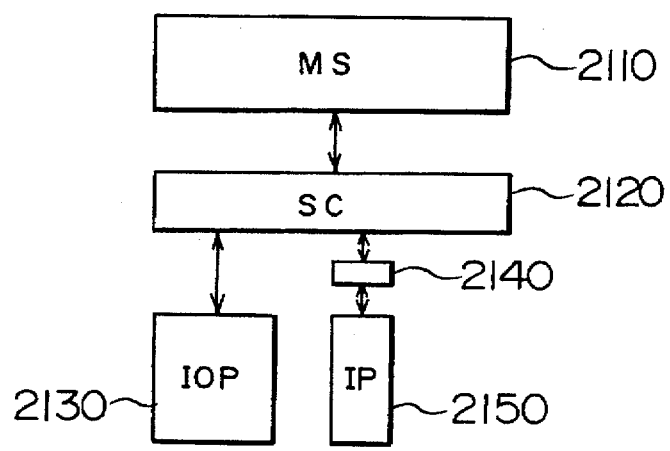
FIG. 21 is a block diagram for explaining an operation of a central processing unit having a single instruction processor.
Figure 22:
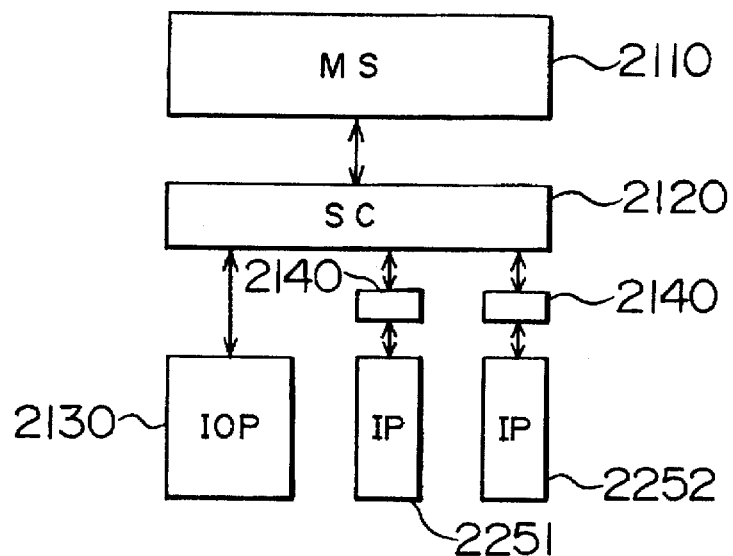
FIG. 22 is a block diagram for explaining an operation of a central processing unit having a plurality of instruction processors.
Figure 23:
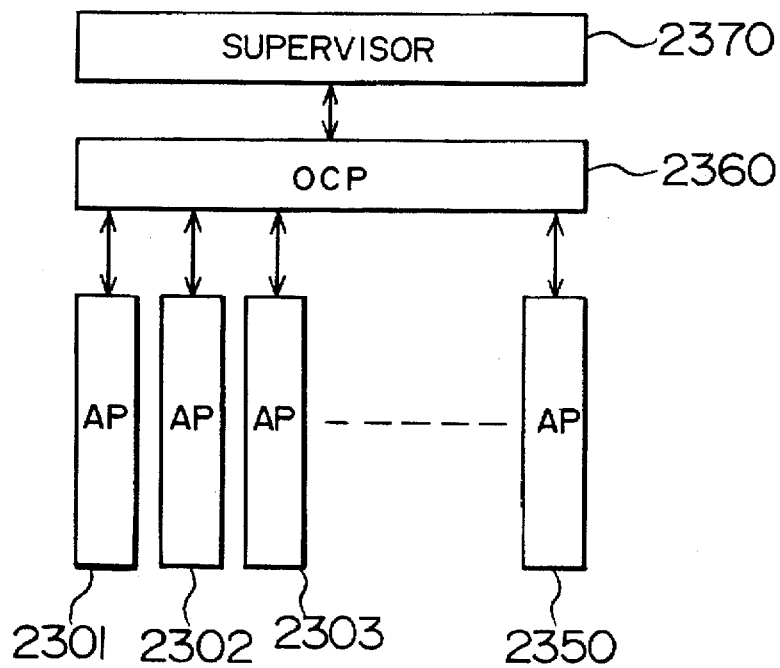
FIG. 23 is a block diagram for showing a software structure of an on-line system.

FIG. 18 shows an example of a comparison of system performance between the conventional multiprocessor system and the multiprocessor system on the present invention. In FIG. 18, an MP/UP ratio shows a ratio of performance of the multiprocessor system to performance of the unit processor system structured by the same number of instruction processors. The horizontal axis shows a multiplicity of the instruction processors and the vertical axis shows a performance ratio of the multiprocessor system. A curve 1801 shows a performance ratio of the multiprocessor system when the number of the instruction processors is increased in the conventional multiprocessor system. This curve shows a state that there is a limit to the system performance below a predetermined value even if multiplicity of the instruction processors is increased because of a limit to the lock control of the supervisors and an increase in the aggravation of the hardware performance of the multiprocessor. A curve 1802 shows an upward trend in the system performance when the multiprocessor of the present invention is used. In this case, higher system performance can be obtained when an interruption between a plurality of on-line systems is smaller. However, even if there is an interruption between the on-line systems, it is possible to realize a multiprocessor system which can substantially improve the system performance from the conventional level by dividing the operation to the plurality of on-line systems to avoid mutual interferences or by dividing the operation to each on line area.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A multiprocessor control method for controlling a multiprocessor system, wherein said multiprocessor system comprises:

a current multiprocessor system, including:

a plurality of first processors on which a current supervisor and at least one online system are executed, said at least one online system being a program for executing transaction processings under control of said current supervisor, and at least a second processor on which a current management supervisor is executed, said current management supervisor being a program for controlling start operation of said current supervisor and for detecting a fault in said current supervisor;

a stand-by multiprocessor system including:

a plurality of third processors on which a stand-by supervisor and at least one stand-by online system are executed, said at least one stand-by online system being a program for executing transaction processings under control of said stand-by supervisor, and at least a fourth processor on which a stand-by management supervisor is executed, said stand-by management supervisor being a program for controlling start operation of said stand-by supervisor and for detecting a fault in said stand-by supervisor, and a transmission path for connecting said current multiprocessor system with said stand-by multiprocessor system, wherein said multiprocessor control method comprises the steps of:

detecting, in said stand-by management supervisor, a fault in said current management supervisor;

starting, by said stand-by management supervisor, said stand-by supervisor when said stand-by management supervisor detects a fault in said current management supervisor; and starting, by said stand-by supervisor, said stand-by online system to execute said transaction processings.

2. A multiprocessor control method according to claim 1, further comprising the steps of:

detecting in said current management supervisor a fault occurring in said current supervisor;

informing said stand-by management supervisor of a fault when said current management supervisor detects said fault occurring in said current supervisor;

causing said stand-by supervisor to start, by said stand-by management supervisor; and causing said stand-by online system to start, by said stand-by supervisor, thereby starting the processings in said stand-by online system.

3. A multiprocessor control method according to claim 1, further comprising the steps of:

detecting, in said current supervisor, a fault occurring in said current online system;

informing said current management supervisor of a fault when said current supervisor detects said fault occurring in said current online system;

informing said stand-by management supervisor of said fault when said current supervisor detects said fault occurring in said current online system;

causing said stand-by supervisor to start, by said stand-by management supervisor; and causing said stand-by online system to start, by said stand-by supervisor, thereby starting the processings in said stand-by multiprocessor system.

4. A multiprocessor system comprising:

a current multiprocessor system including:

a plurality of first processors for operating thereon a current supervisor and at least one online system which executes transaction processings under control of said current supervisor, and at least a second processor for operating thereon a current management supervisor which executes start operation of said current supervisor and detects a fault in said current supervisor, a stand-by multiprocessor system including:

a plurality of third processors for operating thereon a stand-by supervisor and at least a stand-by online system which executes transaction processings under control of said supervisor, and at least a fourth processor for operating thereon a stand-by management supervisor which executes start operation of said stand-by supervisor and detects a fault in said stand-by supervisor, and a transmission path for connecting said current multiprocessor system with said stand-by multiprocessor system.

5. A multiprocessor system according to claim 4, wherein said plurality of first processors and said second processor are loosely coupled.

6. A multiprocessor system according to claim 4, wherein said stand-by management supervisor detects a fault in said current management supervisor and starts said stand-by management supervisor when said stand-by management supervisor detects a fault in said current management supervisor, and wherein said stand-by supervisor starts said stand-by online system to execute said transaction processings.

7. A multiprocessor system according to claim 4, wherein said current management supervisor detects a fault occurring in said current supervisor and informs said stand-by management supervisor when said current management supervisor detects said fault occurred in said current supervisor, and wherein said stand-by management supervisor causes said stand-by supervisor to start and said stand-by supervisor causes said stand-by online system to start.

8. A multiprocessor system according to claim 4, wherein said current supervisor detects a fault in said current online system, informs said current management supervisor when said current supervisor detects a fault occurring in said current online system, wherein said current management supervisor informs said stand-by management supervisor of said fault when said current supervisor detects said fault occurring in said current online system, wherein said stand-by management supervisor causes said stand-by supervisor to start, and wherein said stand-by supervisor causes said stand-by online system to start, thereby starting the processings in said stand-by multiprocessor system.

* * * * *